United States Patent [19]
Kozuki et al.

[11] Patent Number: 5,958,617
[45] Date of Patent: Sep. 28, 1999

[54] THIN TYPE BATTERY

[75] Inventors: Kiyomi Kozuki, Moriguchi; Yoshiko Nishimura, Sakai; Rikio Iida, Ikoma; Takabumi Fujii, Suita; Kazuo Saito, Kadoma; Naoto Kunoike, Osaka; Toru Takai, Kyoto; Kenjin Masumoto, Kishiwada; Yukimasa Niwa, Suita, all of Japan

[73] Assignee: Matsushita Electric Industrial Co., Ltd., Osaka, Japan

[21] Appl. No.: 08/894,864

[22] PCT Filed: Dec. 11, 1996

[86] PCT No.: PCT/JP96/03615

§ 371 Date: Dec. 10, 1997

§ 102(e) Date: Dec. 10, 1997

[87] PCT Pub. No.: WO97/23009

PCT Pub. Date: Jun. 26, 1997

[51] Int. Cl.$^6$ ...................................................... H01M 2/12
[52] U.S. Cl. .................. 429/53; 429/56; 429/61; 429/7
[58] Field of Search ...................... 439/157, 162, 439/53, 62, 56, 61, 171–174, 7, 57

[56] References Cited

U.S. PATENT DOCUMENTS 4,943,497  7/1990  Oishi et al. ............................. 429/53
5,156,930  10/1992  Daio et al. .............................. 429/53
5,705,290  1/1998  Azema ..................................... 429/53

FOREIGN PATENT DOCUMENTS

| 0 573 998 A1 | 12/1993 | European Pat. Off. . |
| 02112151 | 4/1990 | Japan . |
| 2-112151 | 4/1990 | Japan . |
| 6-203818 | 7/1994 | Japan . |
| 06215747 | 8/1994 | Japan . |
| 6-231743 | 8/1994 | Japan . |
| 7-105933 | 4/1995 | Japan . |
| 8-115714 | 5/1996 | Japan . |
| 8-306351 | 11/1996 | Japan . |

*Primary Examiner*—Anthony Skapars
*Attorney, Agent, or Firm*—Ratner & Prestia

[57] ABSTRACT

To enhance the safety of battery, in a thin type battery, by securely cutting off electric connection when the internal pressure of the battery is raised.

An upper valve disc and a lower valve disc are disposed through an electric insulating gasket, a part of the upper valve disc is formed in a recess shape, and a tiny hole and a continuous thin wall part are formed in a part of the lower valve disc, and the bottom of the recess part of the upper valve disc and the portion enclosed by the tiny hole and thin wall part of the lower valve disc are fused, and the structure is constituted so that the strength of the lower valve disc may be greater than the strength of the upper valve disc.

15 Claims, 7 Drawing Sheets

THIN TYPE BATTERY

This application is the U.S. national-phase application of PCT International Application No. PCT/JP96/03615.

TECHNICAL FIELD

The present invention relates to a thin type battery, and more particularly to a sealing member having an explosion-proof function composed in a thin type battery.

BACKGROUND ART

Recently, in the cordless and portable trend of battery-operated appliances such as audio and video devices and personal computers, batteries of small size, light weight, and high energy density are demanded as their driving power sources. In particular, the lithium secondary battery is high in energy density, and is highly expected as the battery for next generation, and its latent market scale is great. Besides, from the viewpoint of thin design of appliances and effective use of space, there is a mounting demand for thin type of battery.

However, the enclosed type battery, for example, the lithium secondary battery using lithium metal or carbon material as negative electrode has been known to have a problem of generation and accumulation of gas in the battery due to decomposition of electrolyte or active material when falling into a state of short-circuit, overcharging, or reverse charging.

Figure 12:
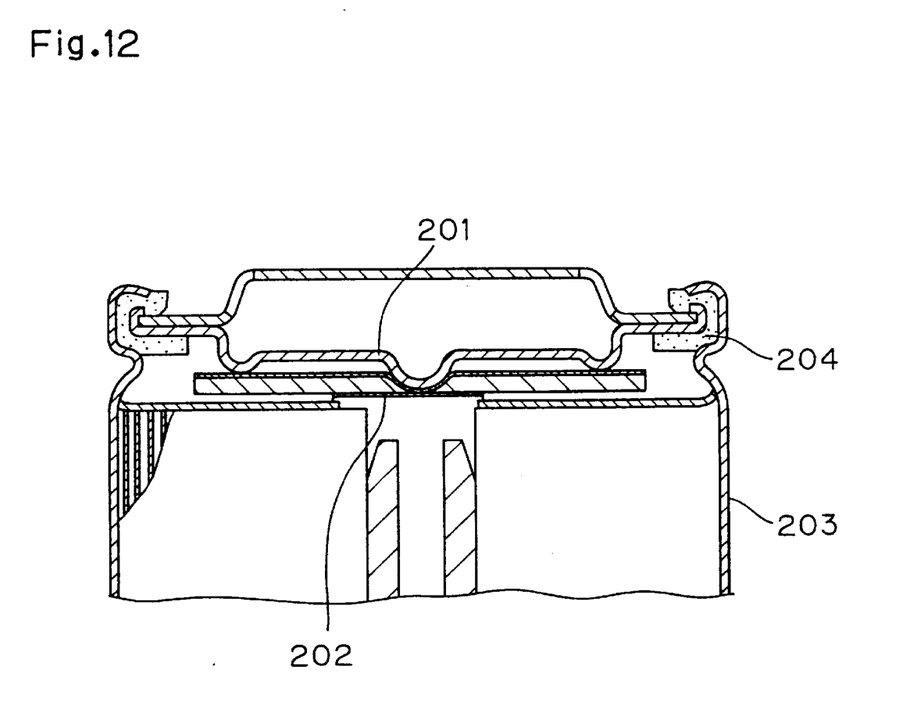
FIG. 12 is a side sectional view of a sealing plate of a conventional battery.

In the event of such short-circuit, overcharging, or reverse charging, to prevent explosion of battery, an explosion-proof device has been proposed, for example, as disclosed in Japanese Laid-open Patent 2-112151. That is, as shown in FIG. 12, a reed 202 is fitted to an explosion-proof valve 201 which is deformed as the internal pressure builds up, and when the internal pressure reaches a specified value, the reed 202 is separated from the explosion-proof valve 201 or torn apart, and the current is cut off. In FIG. 12, the explosion-proof valve 201 is installed in a housing 203 of the battery through a gasket 204.

In such constitution, however, when reaching the specified internal pressure, if the explosion-proof valve 201 is not securely set apart from the reed 202, or if a burr is formed by tearing, although the explosion-proof valve 201 has functioned, the conductive state between the explosion-proof valve 201 and reed 202 may be kept, and the state of short-circuit or the like may persist.

Or, when the explosion-proof device of such cylindrical battery is applied in an elliptical sealing plate of small width dimension as used in thin type battery, since the effective receiving surface of gas pressure is small and the width is narrow in the elliptical sealing plate, deformation of the metal explosion-proof valve by elevation of internal pressure is insufficient, and the explosion-proof valve may fail to work in spite of high internal pressure of battery. Besides, in the thin type battery, since the explosion-proof pressure of the battery case is lower than in the cylindrical battery, the operating pressure of the explosion-proof valve must be set lower than in the cylindrical battery. Accordingly, it is required to reduce the thickness of the elastic metal explosion-proof valve so as to increase deformation of explosion-proof valve due to elevation of internal pressure.

Moreover, in the state of low internal pressure of battery, if the thickness of the explosion-proof valve is reduced in order to deform the metal explosion-proof valve sufficiently, fluctuations occur in the operating pressure of the explosion-proof valve, and the explosion-proof valve may not function securely.

Figure 11:
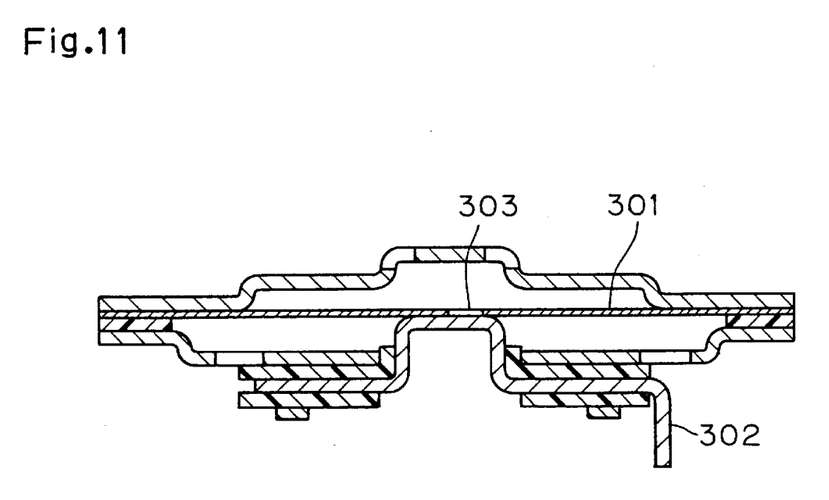
FIG. 11 is a side sectional view of a conventional sealing plate.

On the other hand, an explosion-proof device as shown in FIG. 11 has been also proposed. In FIG. 11, a part of an explosion-proof valve 301 is electrically connected with the upper part of a protrusion of a terminal plate 302 through a fusion part 303. As gas is accumulated in the battery, the explosion-proof valve 301 is deformed upward, and when the internal pressure reaches a specified value, the fusion part 303 is torn apart, and the terminal plate 302 and explosion-proof valve 301 are separated from each other, so that the explosion-proof valve 301 is electrically disconnected from the terminal plate 302.

In this structure, too, when the internal pressure of the battery climbs up, due to insufficient deformation of the metal explosion-proof valve and uneven fusion strength, especially if reaching up to the specified battery internal pressure, the central fusion part of the explosion-proof valve may not be torn apart, and the electric connection in the battery may not be cut off securely.

In the thin type battery, yet, since the width direction dimension is small and the strength is weak, when sealing by crimping, the parts contained inside may be deformed, and since gas is discharged, the thin wall part of electric connection part may often fall in trouble.

DISCLOSURE OF THE INVENTION

It is hence an object of the invention to provide an explosion-proof sealing member for thin type battery, capable of assuring safety and reliability of battery, by operating the valve of a sealing member securely to cut off electrical connection when the internal pressure of the battery is raised due to short-circuit, overcharging or reverse charging.

The thin type battery of the invention comprises (1) a first container having a first opening in an upper surface, (2) an electrode contained in the first container, (3) an electrolyte contained in the first container, and (4) a sealing member.

The sealing member comprises (a) a second container made of metal having a penetration hole in a bottom surface and having a second opening in an upper surface, (b) a lower valve disc of conductive property installed at the bottom side in the second container, (c) an electric insulating gasket installed in an upper peripheral region of the lower valve disc, (d) an upper valve disc of conductive property installed at an upper side of the electric insulating gasket, and (e) a cap-shaped terminal of conductive property installed at the upper side of the upper valve disc, and installed in the second opening.

The periphery of the second container is sealed by crimping by containing together each periphery of the lower valve disc, the electric insulating gasket, the upper valve disc, and the cap-shaped terminal. In this state, the upper valve disc and the cap-shaped terminal conduct with each other electrically, the cap-shaped terminal and the second container are insulated from each other electrically, and the lower valve disc and the second container conduct with each other electrically. The lower valve disc forms a first thin wall part at a position corresponding to the penetration hole. The upper valve disc and the lower valve disc have a junction electrically and integrally joining the first thin wall part and a first region of the upper valve disc.

In the constitution of the invention, when the battery internal pressure is raised by short-circuit, overcharging, or reverse charging, the upper valve disk containing the junction is deformed outside, and by this deforming stress, the first thin wall part containing the junction is torn apart and separated from the lower valve disc. As a result, the upper valve disc and the lower disc are electrically isolated from each other.

In this constitution, preferably, the upper valve disc should form a second thin wall part in a second region. Accordingly, the gas generated in the battery passes through the torn first thin wall part, tears apart the second thin wall part, and the gas further passes through the torn second thin wall part, and is discharged outside of the battery. As a result, sudden temperature rise of the battery or elevation of internal pressure of battery can be effectively prevented.

In the constitution, preferably, a tiny hole continuous to the first thin wall part should be formed in the lower valve disc. Accordingly, the first thin wall part passing through the tiny hole is completely torn apart, and formation of burr or the like is prevented. Therefore, it eliminates defects of keeping conductive state by untorn portion or burr, so that the electric conduction between the lower valve disc and upper valve disc may be completely cut off. Still more, through the tiny hole, the gas pressure can be transmitted to the upper valve disc more quickly, and the upper valve disc can be deformed, and by this deforming stress, the first thin wall part is torn apart from the lower valve disc. Incidentally, by adjusting the thickness or length of the first thin wall part of the lower valve disc, the pressure for cutting off the electric connection can be set arbitrarily.

In the constitution, preferably, concerning the deforming strength of valve discs upon elevation of internal pressure, the strength of the lower valve disc should be larger than the strength of the upper valve disc. Accordingly, deformation of the lower valve disc due to elevation of internal pressure of battery is suppressed, and contact of the upper valve disc and lower valve disc after cutting off can be prevented.

In the constitution, preferably, the first region of the upper valve disc should be in a recess shape, and the bottom of this recess shape and the thin wall part of the lower valve disc should be electrically joined to form a junction by laser welding, ultrasonic welding, resistance welding, fusing, soldering or other joining means. Accordingly, if the internal pressure of the battery is raised, the junction is pushed up from downward to upward. When reaching the specified internal pressure, the junction in the recess shape is largely inverted from downward to upward, and by this inverting stress, the first thin wall part is torn apart, and is separated from the lower valve disc. As a result, the electric contact of the upper valve disc and lower valve disc can be completely prevented.

In the constitution, preferably, a metal reinforcing plate should be disposed between the periphery of the cap-shaped terminal and the upper valve disc. Accordingly, when sealing by crimping, the reinforcing plate supports the pressure from the peripheral edge, and the deformation of the upper valve disc and lower valve disc is suppressed, so that the upper valve disc and lower valve disc small in mechanical distortion can be obtained.

In the constitution, preferably, a PTC (positive temperature coefficient) thermistor element should be disposed in the space between the cap-shaped terminal and upper valve disc. Accordingly, the PTC thermistor element detects the temperature, and generation of excessive current can be prevented.

BEST MODE FOR CARRYING OUT THE INVENTION

Referring now to the drawings, an embodiment of the invention is described in detail below.

Embodiment 1

Figure 10:
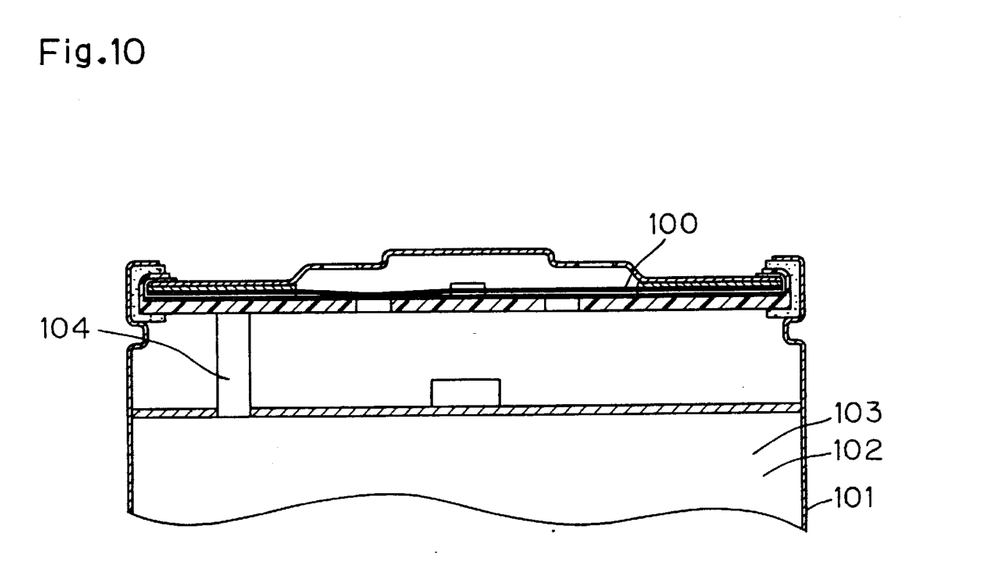
FIG. 10 is a schematic sectional view of essential parts of an embodiment of the thin type battery of the invention.

An essential sectional view of an embodiment of a battery of the invention is shown in FIG. 10. In FIG. 10, an electrode 102 and an electrolyte 103 are contained in a thin container 101 having an opening. The thin container 101 has an elliptical section. An explosion-proof sealing member 100 is disposed in the opening of the thin container 101 to seal through an insulating gasket 105. The electrode 102 is composed of a cathode and an anode through a separator. A part of the explosion-proof sealing member 100 is electrically connected to the electrode 102 through a reed 104.

Figure 1:
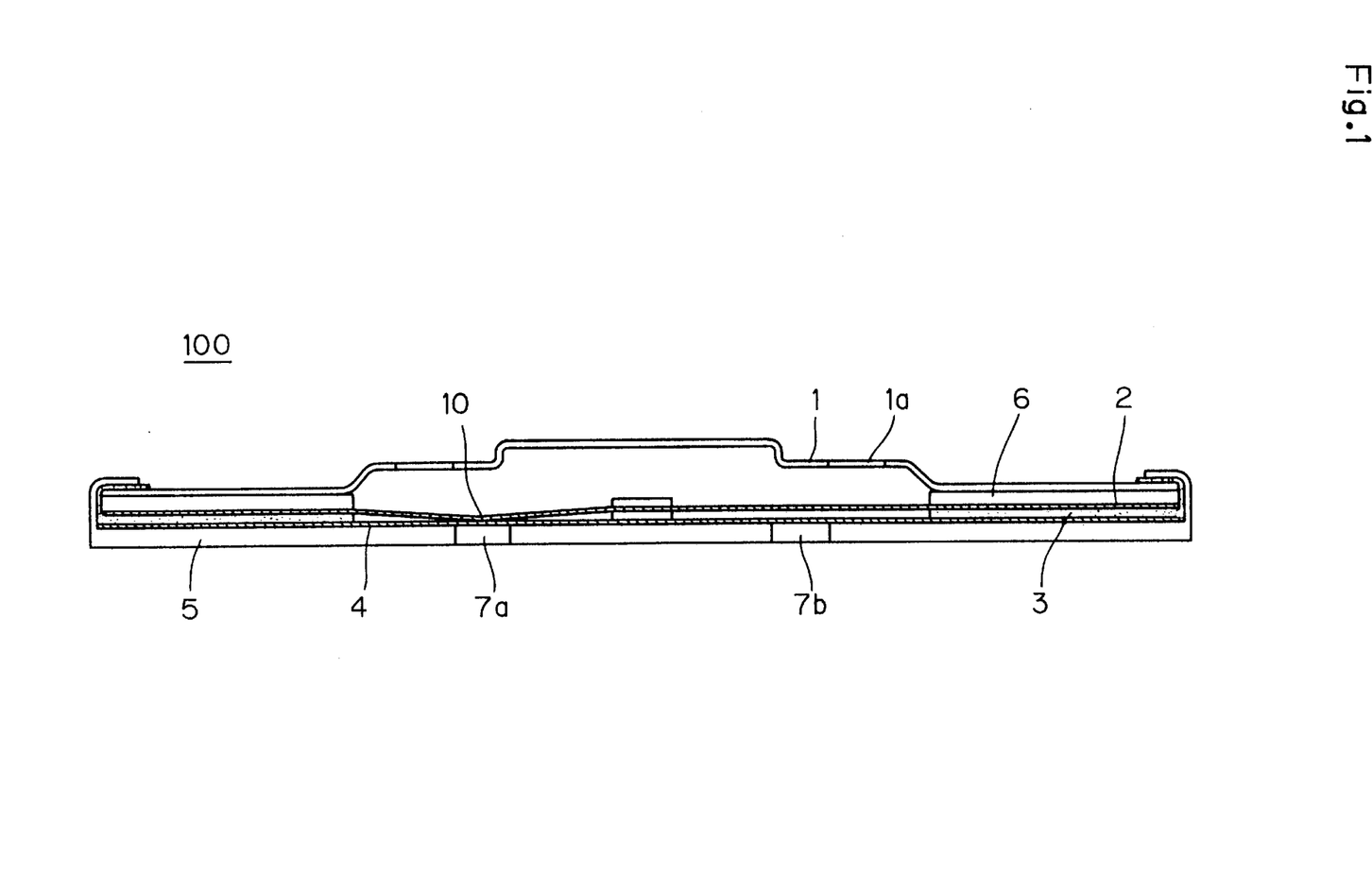
FIG. 1 is a side sectional view showing an embodiment of an explosion-proof sealing member used in a thin type battery of the invention.
Figure 2:
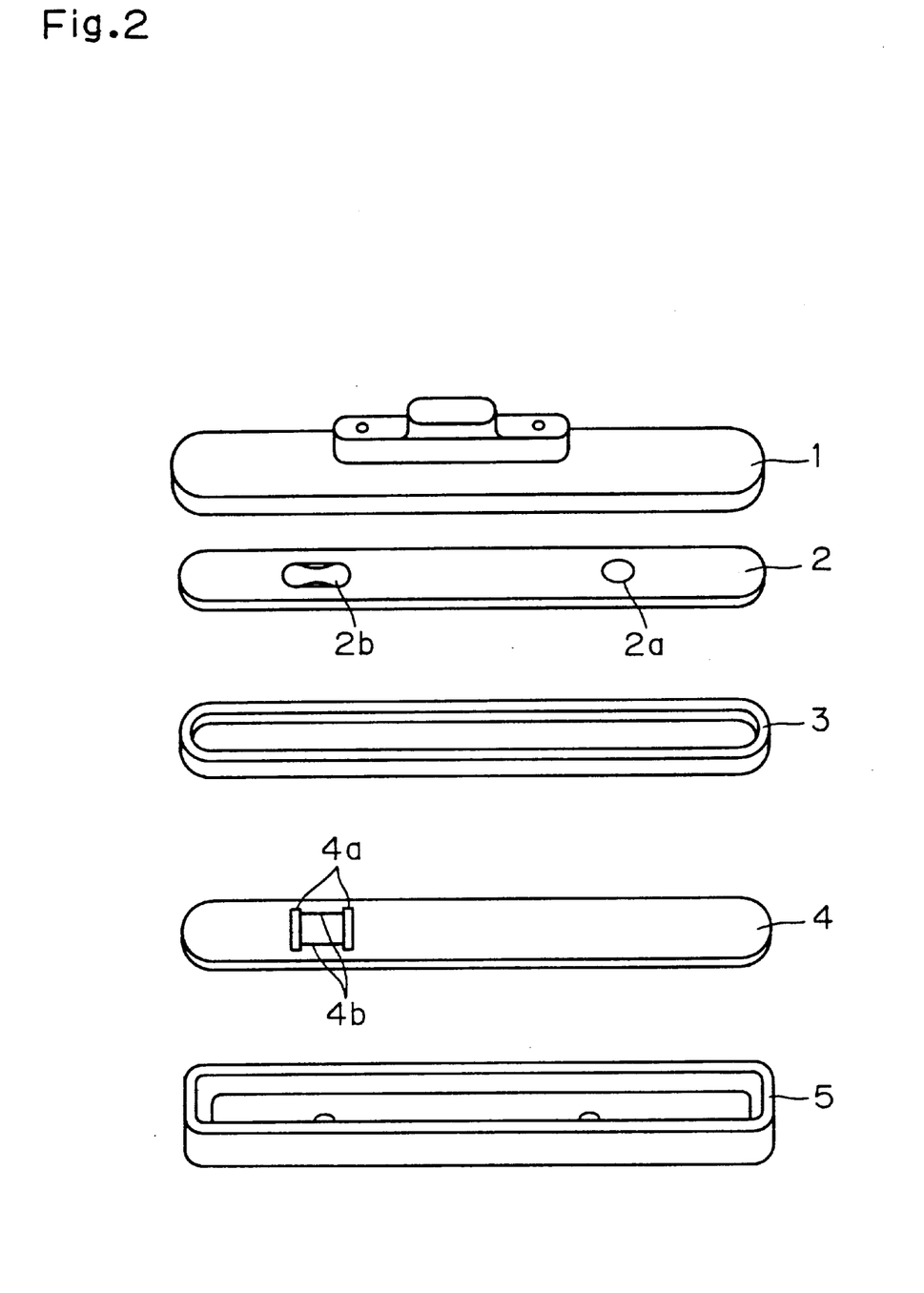
FIG. 2 is a perspective exploded view of the sealing member in FIG. 1.

A detailed sectional view of the sealing member 100 is shown in FIG. 1. A perspective exploded view of the sealing member 100 is shown in FIG. 2. In FIG. 1 and FIG. 2, the sealing member 100 has an upper valve disc 2 and a lower valve disc 4 disposed through an insulating gasket 3 having an opening. That is, the lower valve disc 4 is disposed at the bottom of the inside of a metal case 5. An electric insulating gasket 3 is disposed in the periphery of the upper side of the lower valve disc 4. That is, the insulating gasket 3 has an opening in the center. In the upper side periphery of the lower valve disc 4, the upper valve disc 2 is disposed through the insulating gasket 3. A gap is formed between the lower valve disc 4 and upper valve disc 2, and they are mutually isolated electrically. A metal cap is disposed at the upper side of the cap-shaped terminal 1. The electric insulating gasket 3 is disposed in the upper side periphery of the cap-shaped terminal 1. The peripheral portion of the metal case 5 contains, crimps and seals integrally each periphery of the lower valve disc 4, insulating gasket 3, upper valve disc 2, cap-shaped terminal 1, and insulating gasket 3.

The metal case 5 has a first penetration hole 7a formed in a first region, and a second penetration hole 7b formed in a second region, at right and left symmetrical positions in its bottom. In use, only the first penetration hole 7a works effectively. In the constitution forming two penetration holes 7a, 7b in the metal case 5, when assembling the sealing member, it is not necessary to adjust the right and left positions, and assembling is easy.

The upper valve disc 2 forms a second thin wall part 2a and a recess part 2b. The lower valve disc 4 forms a hole or penetration tiny hole 4a, and a first thin wall part 4b continuous thereto. The first penetration hole 7a, first thin wall part 4b, and recess part 2b are formed at mutually corresponding positions. The inside portion of the first thin wall part 4b of the tiny hole 4a, and the recess part 2b of the upper valve disc 2 are fused to form a junction 10. By this junction 10, the lower valve disc 4 and upper valve disc 2 are electrically connected. The cap-shaped terminal 1 forms a penetration hole 1a.

Figure 9:
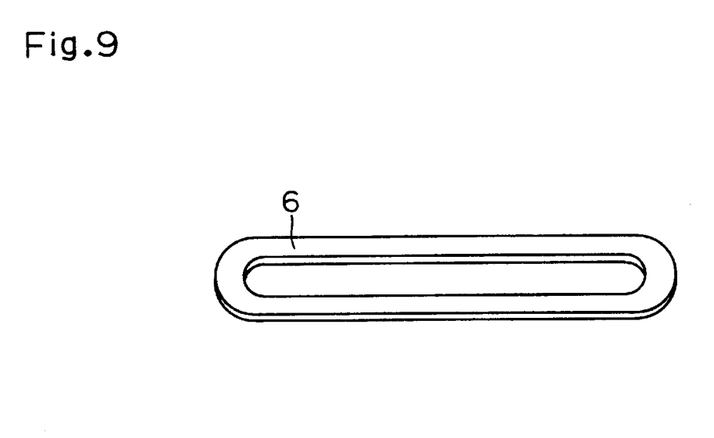
FIG. 9 is a side sectional view of an embodiment of a metal reinforcing plate composed in the sealing member used in the thin type battery of the invention.

In the case of an elliptical sealing member, when crimping and sealing the cap-shaped terminal 1, it is preferred to prevent deformation of the internal parts by supporting the pressure applied to the peripheral edge of the terminal. To prevent deformation, a reinforcing plate 6 is disposed between the periphery of the cap-shaped terminal 1 and the upper valve disc 2. The reinforcing plate 6 is made of metal as shown in FIG. 9, and has an opening in the center.

In this explosion-proof sealing member, a part of the metal case is welded to the reed 104 which is conductive with the plate 102, and the inside bottom of the metal case 5 and the lower valve disc 4 contact with each other. At the junction 10, the lower valve disc 4 and upper valve disc 2 conduct with each other electrically. The periphery of the upper valve disc 2 contacts with the metal cap-shaped terminal 1. The cap-shaped terminal 1 and metal case 5 are disposed through the insulating gasket 3, and are electrically isolated from each other.

In such constitution, when gas is generated and the internal pressure of the battery rises due to short-circuit, overcharging or reverse charging of the battery, the generated gas is transmitted from the first penetration hole 7a of the bottom of the metal case 5 to the junction 10, and the upper valve disc including the junction 10 is deformed in the upward direction, and the first thin wall part 4b including the junction 10 is torn apart by the deforming stress, and is separated from the lower valve disc 4. As a result, the electric connection between the upper valve disc and lower valve disc is cut off, and the current is cut off.

Or, when the internal pressure of the battery is raised, the generated gas passes through the tiny hole 4a and enters the gap between the lower valve disc 4 and upper valve disc 2, and the second thin wall part 2a of the upper valve disc 2 is torn apart by this gas pressure. The generated gas passes through the hole in the second thin wall part, and is discharged outside of the battery.

The junction 10 is formed by fusing the bottom of the recess part 2b of the upper valve disc 2, and the portion enclosed by the tiny hole 4a formed in the lower valve disc 4 and the continuous thin wall part 4b by laser welding.

The upper valve disc 2 is preferably an elastic sheet. In this constitution, by the elevation of internal pressure, the upper valve disc 2 can be deformed sufficiently upward. In the embodiment, an aluminum foil was used as the upper valve disc 2.

In the embodiment, the upper valve disc 2 is made of aluminum, with tensile strength of 6 to 10 $kgf/cm^2$ and thickness of 0.10 mm. In this constitution, conduction after cutting off the electric connection of the upper valve disc 2 and lower valve disc 4 can be securely prevented.

The lower valve disc 4 should be preferably made of material stronger than the upper valve disc 2. In this constitution, the lower valve disc 4 is less likely to be deformed upward by elevation of battery internal pressure, and contact of the lower valve disc 4 and upper valve disc 2 can be completely prevented. Besides, when the internal pressure of the battery is raised, deformation of the lower valve disc 4 can be suppressed, and contact between the upper valve disc 2 and lower valve disc 4 after cutting off is prevented. In the embodiment, the lower valve disc 4 is made of an aluminum foil with tensile strength of 14 to 18 $kgf/cm^2$, and thickness of 0.10 mm.

Figure 5:
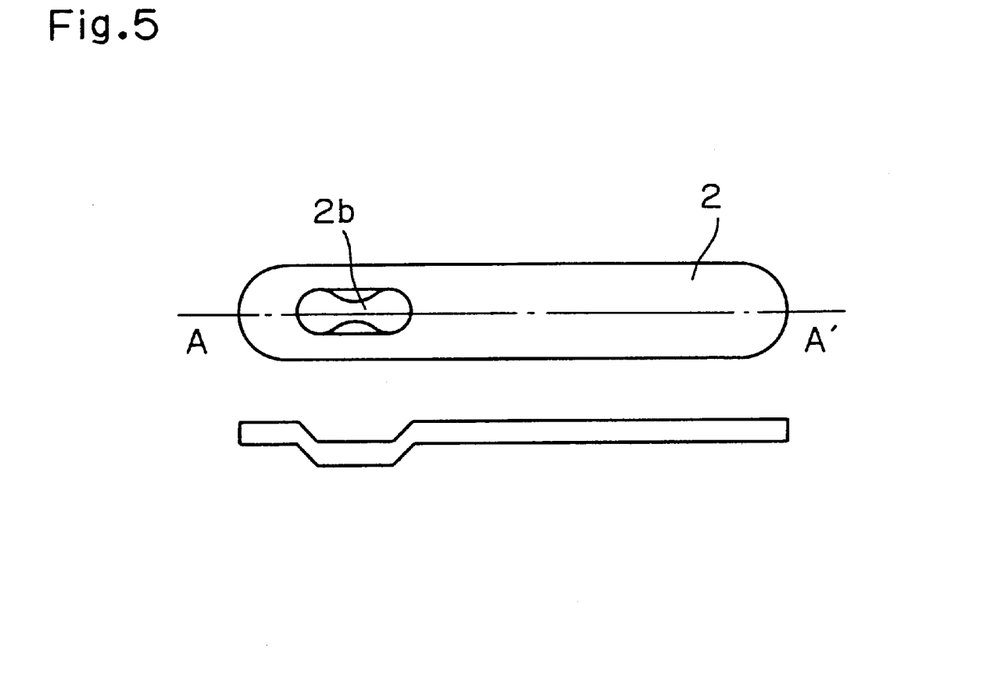
FIG. 5 shows a perspective view and a side sectional view of an embodiment showing a recess part of an upper valve disc composed in the sealing member used in the thin type battery of the invention.

In the embodiment, as shown in FIG. 5, the recess part 2b is formed in a first region of the upper valve disc 2, and the bottom of this recess part 2b is fused to the first thin wall part 4b of the lower valve disc 4. In this constitution, when the internal pressure of the battery is raised, the recess part 2b of the upper valve disc 2 is inverted largely from downward to upward by the internal pressure so that the deformation of the upper valve disc 2 may be increased. By this inverting force, the first thin wall part 4b including the junction 10 is torn apart from the lower valve disc 4, so that the electric connection of the upper valve disc 2 and lower valve disc 4 can be completely prevented. The upper valve disc 2 is sufficiently deformed, and conduction after cutting off the electric junction 10 of the lower valve disc 4 and upper valve disc 2 can be prevented. By forming the recess part 2b in the upper valve disc 2, the adhesion and smoothness of the upper valve disc 2 and lower valve disc 4 are enhanced, and stable laser welding can be done.

Figure 3:
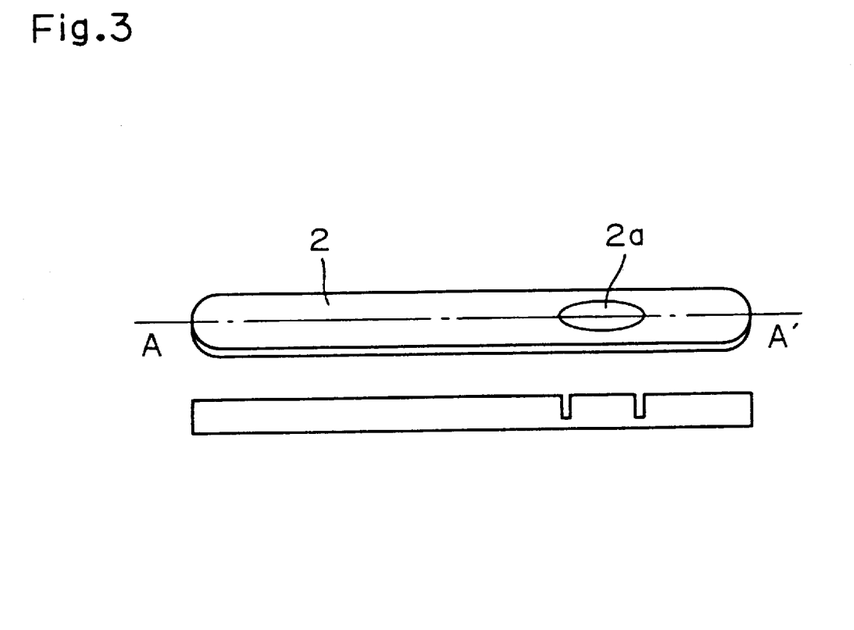
FIG. 3 shows a perspective view and a side sectional view of an embodiment showing a first thin wall part of an upper valve disc composed in the sealing member used in the thin type battery of the invention.
Figure 4:
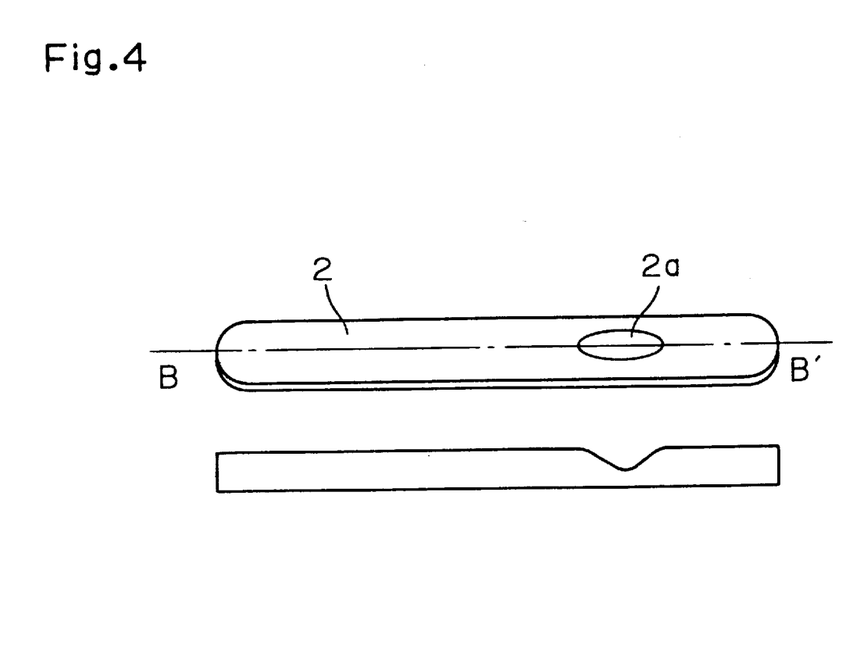
FIG. 4 shows a perspective view and a side sectional view of other embodiment showing a first thin wall part of an upper valve disc composed in the sealing member used in the thin type battery of the invention.

As a method of forming the second thin wall part 2a in the upper valve disc 2, the following methods are known. As shown in FIG. 3, a thin wall part of ring shape, circular shape, C-shape, or straight shape is formed by striking a metal punch or the like. Or, as shown in FIG. 4, a locally hemispherical thin wall portion is formed by applying an appropriate load by a steel ball. In this embodiment, the second thin wall part 2a was formed by using a circular metal punch as shown in FIG. 3. When the internal pressure of the battery exceeds a specified value, this thin wall part 2a is torn apart, and the gas in the battery is discharged outside of the battery.

Figure 6:
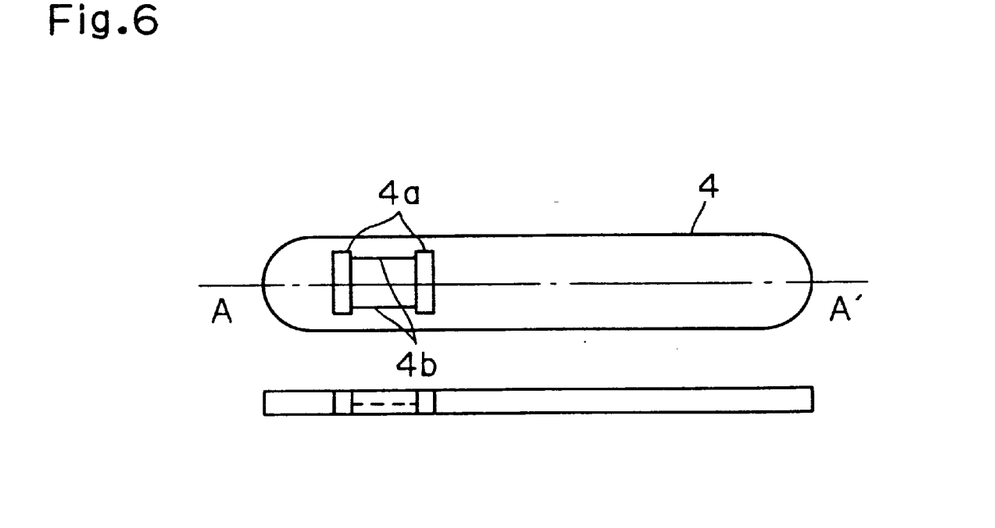
FIG. 6 shows a perspective view and a side sectional view of an embodiment showing a lower valve disc composed in the sealing member used in the thin type battery of the invention.
Figure 7:
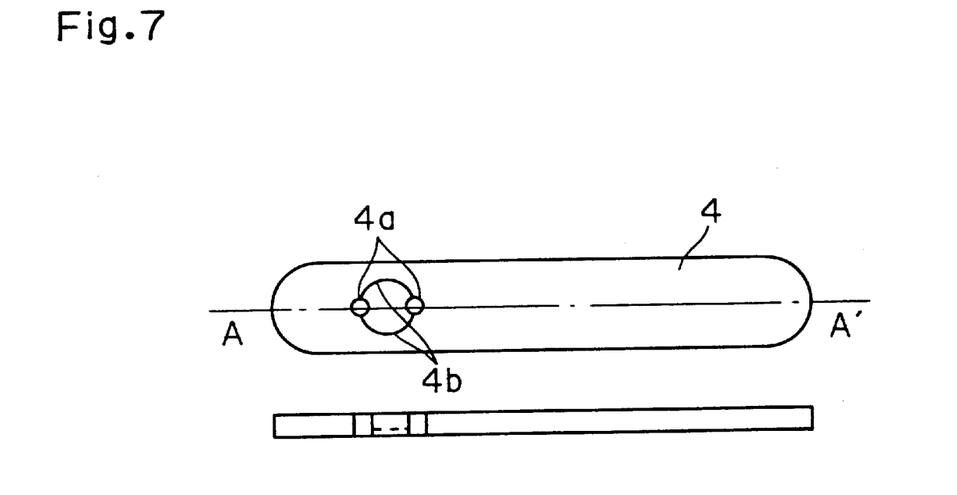
FIG. 7 shows a perspective view and a side sectional view of other embodiment showing a lower valve disc composed in the sealing member used in the thin type battery of the invention.
Figure 8:
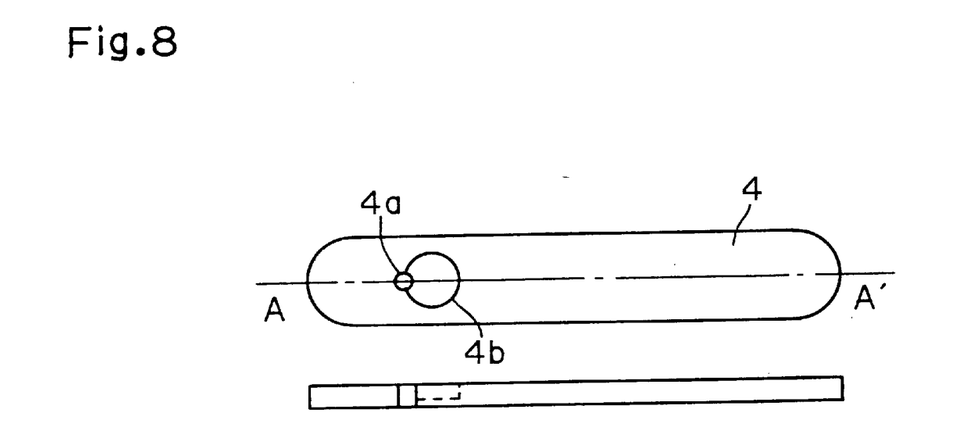
FIG. 8 shows a perspective view and a side sectional view of a different embodiment showing a lower valve disc composed in the sealing member used in the thin type battery of the invention.

The tiny hole or penetration hole 4a and first thin wall part 4b provided in the lower valve disc 4 may be formed in various shaped as shown in FIG. 6, FIG. 7, and FIG. 8. In this embodiment, as shown in FIG. 6, two mutually confronting penetration grooves are arranged at an interval of 1.8 mm to form tiny holes 4a, and a rectangular first thin wall part 4b is formed between these two tiny holes 4a, so that the first thin wall part 4b may be continuous to the tiny holes or penetration holes 4a. The first thin wall part 4b may be also formed in a shape as shown in FIG. 7, in which a circular thin wall part 4b is formed, and two tiny holes 4a are formed at opposite positions on the circumference of the thin wall part 4b. Or, as shown in FIG. 8, a circular thin wall part 4b may be formed, and tiny holes or penetration holes 4a may be formed on the circumference of the thin wall part 4b. Meanwhile, by adjusting the thickness or length of the first thin wall part 4b, the cut-off operating pressure of the battery can be set arbitrarily.

In FIG. 3 through FIG. 8, upper side drawings are perspective views, and the section along line A-A' or line B-B' in the perspective view is shown at the lower side.

In the embodiment, a PTG thermistor element can be disposed also in the space between the cap-shaped terminal 1 and upper valve disc 2, so that excessive current can be prevented.

By the constitution of the embodiment, in the state of short-circuit, overcharging or reverse charging as mentioned above, when the battery internal pressure reaches a specified pressure, the electric connection is cut off securely. Moreover, in the event of an abnormal rise of internal pressure, the second thin wall part 2a of the upper valve disc 2 is torn apart, and the internal gas is discharged. As a result, a higher safety of the battery is assured.

Still more, by disposing a metal reinforcing plate 6 between the cap-shaped terminal 1 and upper valve disc 2, when crimping and sealing the elliptical sealing member, deformation of internal parts occurring due to pressure of the peripheral edge can be prevented.

In such battery of the embodiment using the sealing member, the cut-off operating pressure at the junction upon elevation of internal pressure of the battery is shown in Table 1. By contrast, using the conventional sealing member as shown in FIG. 11, the result of measuring the cut-off operating voltage at the junction of the battery is also shown in Table 1.

The cut-off operating voltage of the sealing members of both embodiment and prior art was set at 6 kg/cm$^2$.

TABLE 1

| Battery | Explosion-proof valve operating pressure | Fluctuations |
|---|---|---|
| Sealing plate of prior art | x = 9.32 | x = 2.20 |
| Sealing plate of invention | x = 6.30 | x = 0.30 |

Criterion: Operating pressure—excellent in a range of 5 to 7 kg/cm$^2$.
Fluctuations—excellent within 0.8

As shown in Table 1, in the battery using the sealing member of the embodiment, the first thin wall part 4b including the junction 10 was securely torn apart from the lower valve disc 4. The operating pressure when tearing apart was around 6 kg/cm$^2$, which conformed to the specified cut-off operating pressure. Fluctuations of the cut-off operating pressure were small.

By contrast, the battery using the sealing member of the prior art operated at around 9 kg/cm$^2$, and the operating pressure was considerably higher than the set value, and the fluctuations were wide.

Industrial Applicability

As described herein, the explosion-proof sealing member for thin type battery of the invention is applied to the thin type battery. When the internal pressure of the battery is elevated due to short-circuit, overcharging or reverse charging of the battery, the junction of the upper valve disc and lower valve disc is torn apart, and electric connection is cut off. As a result, conductive state due to insufficient deformation of valve disc, uneven fusion, or burr may be perfectly prevented, and electric connection can be cut off securely. Still more, the generated gas can be effectively discharged outside of the battery.

We claim:

1. A thin type battery comprising:
   (1) a first container having a first opening in an upper surface,
   (2) an electrode contained in said first container,
   (3) an electrolyte contained in said first container, and
   (4) a sealing member,
   wherein said sealing member comprises:
      (a) a second container made of metal having a penetration hole in a bottom surface, a periphery, and a second opening in an upper surface,
      (b) a lower valve disc of conductive property disposed on said bottom surface of said second container, said lower valve disc having an upper surface, a first peripheral edge and including a first thin wall section corresponding to said penetration hole,
      (c) an electric insulating gasket disposed on said upper surface of said lower valve disc, and extending peripherally along said upper surface and having a second peripheral edge,
      (d) an upper valve disc of conductive property disposed on said electric insulating gasket, and having a third peripheral edge, and
      (e) a cap-shaped terminal of conductive property disposed upon said upper valve disc, and within said second opening, and including a fourth peripheral edge,
      wherein the periphery of said second container seals said second container by coupling together said first peripheral edge, said second peripheral edge, said third peripheral edge, and said fourth peripheral edge, said upper valve disc and said cap-shaped terminal contacting each other electrically, said cap-shaped terminal and said second container electrically insulated from each other, and said lower valve disc and said second container contacting each other electrically, and,
   wherein said upper valve disc and said lower valve disc are joined electrically at a junction connecting said first thin wall section and a first region of said upper valve disc, and
   wherein said first thin wall section including said junction is torn and separated from said lower valve disc at said junction when the pressure in said first container reaches a specified value, so that said upper valve disc and said lower valve disc are electrically isolated from each other.

2. A thin type battery of claim 1, wherein said upper valve disc includes a second thin wall section in a second region, and wherein gas generated in said first container passes through a first hole formed by tearing of said first thin wall section from said lower valve disc, tears said second thin wall part from said upper valve disc to form a second hole, passes through said second hole, and is discharged outside of said first container.

3. A thin type battery of claim 2, wherein said cap-shaped terminal includes a third hole, and said gas passes through said third hole, and is discharged outside of said first container.

4. A thin type battery of claim 1, wherein said lower valve disc includes a further penetration hole, said pressure in said first container is applied to said upper valve disc through said further penetration hole, said upper valve disc is deformed upward by the force of said pressure, and said first thin wall section including said junction is torn and separated from said lower valve disc at said junction by the stress due to deformation of said upper valve disc, when said pressure reaches said specified value.

5. A thin type battery of claim 1, wherein said lower valve disc has a larger mechanical strength than said upper valve disc.

6. A thin type battery of claim 1, wherein said first region of said upper valve disc has a recessed portion, the bottom of said recessed portion joined to said first thin wall section of said lower valve disc to form said junction, and wherein said recessed portion is inverted upward, creating an inversion force when said pressure in said first container reaches said specified value, and said first thin wall section including said junction is torn and separated from said lower valve disc due to said inversion force, thereby electrically isolating said upper valve disc and lower valve disc from each other.

7. A thin type battery of claim 1, wherein said lower valve disc includes a further penetration hole adjacent said first thin wall section, said first thin wall section including said junction is torn and separated from said lower valve disc when the pressure in said first container reaches said specified value, thereby electrically isolating said upper valve disc and said lower valve disc from each other.

8. A thin type battery of claim 1, wherein said lower valve disc includes a plurality of further penetration holes disposed adjacent and surrounding said first thin wall section, said first thin wall section including said junction is torn and separated from said lower valve disc when the pressure in said first container reaches said specified value, thereby electrically isolating said upper valve disc and said lower valve disc from each other.

9. A thin type battery of claim 1, wherein at least two penetration grooves are formed in a region of said first thin wall section, wherein said first thin wall section including said junction is torn and separated from said lower valve disc at the site of said two penetration grooves when the pressure in said first container reaches said specified value, thereby electrically isolating said upper valve disc and said lower valve disc from each other.

10. A thin type battery of claim 1, wherein a conductive reinforcing plate is installed between the periphery of said cap-shaped terminal and the periphery of said upper valve disc.

11. A thin type battery of claim 1, wherein a positive characteristic thermistor element is disposed in a gap between said cap-shaped terminal and said upper valve disc.

12. A thin type battery of claim 1, wherein said lower valve disc has a larger mechanical strength than said upper valve disc, said upper valve disc forms a second thin wall section, said first region of said upper valve disc has a recessed portion, the bottom of said recessed portion joined to said first thin wall section to form said junction, plurality of further penetration holes is formed through said lower valve disc and around said first thin wall section, said recessed portion is inverted upward creating an inversion force when said pressure in said first container reaches said specified value, said first thin wall section including said junction is torn and separated from said lower valve disc due to said inversion force said second thin wall section is torn and separated from said upper valve disc, forming an aperture, and wherein gas generated in said first container passes through said aperture and is discharged outside of said first container.

13. A thin type battery of claim 1, wherein said upper valve disc comprises a metal sheet.

14. A thin type battery of claim 1, wherein said lower valve disc comprises a metal sheet.

15. A thin type battery of claim 1, wherein said first thin wall section has a shape selected from the group consisting of circular, C-shaped, ring shaped, straight, and hemispherical.

* * * * *